Jan. 8, 1963 J. E. SMITH 3,072,261
SEDIMENT TRAPPING HYDRAULIC RESTRICTION
Filed April 4, 1960
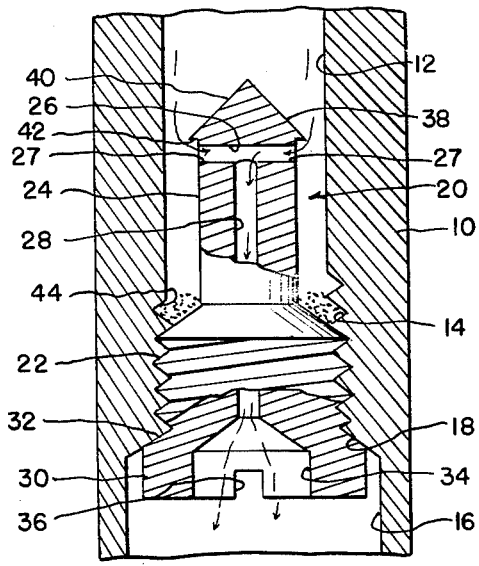
INVENTOR.
JOHN E. SMITH
BY
Whittemore, Hulbert &
Belknap
ATTORNEYS

United States Patent Office 3,072,261
Patented Jan. 8, 1963

3,072,261
SEDIMENT TRAPPING HYDRAULIC RESTRICTION
John E. Smith, Rochester, Mich., assignor to Holley Carburetor Company, Van Dyke, Mich., a corporation of Michigan
Filed Apr. 4, 1960, Ser. No. 19,916
1 Claim. (Cl. 210—532)

This invention relates to a restriction or jet construction. More particularly, this invention relates to a sediment trapping restriction for use in a fluid system and particularly in a hydraulic circuit.

In hydraulic circuits the maintenance problems are always of paramount importance. When installing the various pipes, tubes and fittings of a hydraulic system, it is necessary that they be absolutely clean from all kinds of foreign matter. Even though the proper precaution is taken, it is still possible for dirt and tiny foreign particles to enter the system. The hydraulic fluid holds in suspension tiny dirt and metal particles which if not removed may injure the units and parts through which they pass.

Although it is common practice to employ various screening or straining devices to remove the foreign particles in the reservoir, pressure line or return line, it is sometimes found that conventional filters cannot fit into a particular package or system, etc., without considerable difficulty. This invention has overcome this problem by providing a device which not only serves as a restriction, but in addition thereto provides means for collecting the suspended foreign particles from the fluid as the fluid flows across the restriction.

It is an object of the present invention to provide a sediment trapping restriction.

Another object of the invention is to provide a combination restriction and sediment trap for use in a hydraulic circuit.

Still another object of the invention is to provide a sediment trapping restriction which is easily adapted for insertion in and removal from a hydraulic conduit.

A further object of the invention is to provide a conduit having an internal threaded portion and an external threaded member adapted for insertion into said conduit for engagement with said threaded portion, a restricted passage in said member, said member including a reduced portion which is smaller in diameter than said conduit and a dirt deflector which is formed on the upstream end of said reduced portion so as to deflect and guide the foreign particles in the fluid away from the entrance to said restricted passage.

A still further object of the invention is to provide a conduit having an internal threaded portion and an external threaded member adapted for insertion into said conduit for engagement with said threaded portion, a restricted passage in said member, said member including a reduced portion which is smaller in diameter than said conduit and a dirt deflector which is formed on the upstream end of said reduced portion so as to deflect and guide the foreign particles in the fluid away from the entrance to said restricted passage, whereby the foreign particles removed from the fluid are collected in the conduit along the outside of the reduced portion of said member.

Another object of the invention is to provide a conduit having an internal threaded portion and an external threaded member adapted for insertion into said conduit for engagement with said threaded portion, said member including a reduced portion which is smaller in diameter than said conduit and a dirt deflector formed on the outer end of said reduced portion, a restricted passage in said member having its entrance immediately below said dirt deflector, whereby the foreign particles suspended in the fluid flowing through the conduit are deflected and guided away from the entrance to said passage by said dirt deflector.

Still another object of the invention is to provide a conduit having an internal threaded portion and an external threaded member adapted for insertion into said conduit for engagement with said threaded portion, said member including a reduced portion which is smaller in diameter than said conduit and a dirt deflector formed on the outer end of said reduced portion, a restricted passage in said member having a pair of opposed entrances immediately below said dirt deflector whereby the flow through each entrance tends to restrict the flow through the other entrance, said dirt deflector guiding the suspended foreign particles in the fluid away from said entrances.

A further object of this invention is to provide a simplified low cost structure of the afore-mentioned type having certain advantages contributing to efficiency, reliability and long life as well as ease of maintenance.

Other objects and features of the invention will become apparent as the description proceeds, especially when taken in conjunction with the accompanying drawing, illustrating a preferred embodiment of the invention, wherein:

The FIGURE is a sectional elevational view taken on the center line of the device.

It has been the accepted practice to utilize a threaded jet or member in a hydraulic conduit which has a restricted passage extending therethrough from one end to the other. Although filters are utilized in the hydraulic systems, it is still possible for foreign particles to become lodged in the restricted passage. This invention overcomes this problem.

The drawing shows part of a hydraulic conduit 10 having a flow passage 12 therein. An internal threaded portion 14 is provided in the conduit 10 which has a larger diameter flow passage 16 on the downstream side of the restriction to be subsequently described. A shoulder 18 is provided intermediate the threaded flow passage 12 and the enlarged flow passage 16 which are in axial alignment with one another.

The restriction 20, which is positioned in the conduit 10, is comprised generally of a threaded member 22 and a reduced cylindrical portion 24 integrally formed therewith. A conduit or passage 26 extends radially through the reduced cylindrical portion 24 so as to provide a pair of entrances 27 for the axially extending passage 28.

The restriction 20 has a head portion 30 which has a shoulder 32 formed thereon for engaging the conduit shoulder 18 when in an adjusted position. Passage 28 has an enlarged portion 34 formed in the head portion 30. A slot 36 is provided on the head portion for receiving a tool for inserting or removing the restriction 20.

A foreign particle or dirt deflector 38 is formed on the outer end of the reduced cylindrical portion 24 which is located on the downstream side of the conduit 10. The deflector 38 includes an outer portion 40 and a shoulder portion or rim 42 which extends radially beyond the entrances 27. The deflector 38, which may be either of a conical or parabolic shape, is located immediately above the entrances 27 to the passage 28 for the expressed purpose of deflecting and guiding the large foreign or dirt particles away from the entrances 27. This action results from an inertia effect which prevents the foreign particles from sharply changing their flow directions, and they are thus swept clear of the entrances to the radially extending passage 26. Therefore, the particles flowing by the deflector outer portion 40 fall into the collecting chamber 44 formed by the conduit 10 and the reduced cylindrical portion 24 of the restriction 20. The inertia of the particles prevents the particles from following the fluid flow through the axially extending passage 28.

This invention has another unique feature which makes it very desirable for use in a hydraulic circuit. The diameter of conduit 26, which provides a pair of entrances 27 to the axially extending passage 28, may be increased or made larger and still have the desirable restrictive qualities of a restriction of a smaller diameter in a conduit having uni-directional flow. Since the fluid flows through both entrances, which are opposite to each other, the flow through one entrance 27 tends to restrict the flow coming from the other entrance 27. The advantage of such an arrangement is that since the conduit 26 can be of a larger diameter, the possibility of dirt particles lodging in the passages 26 or 28 is minimized.

After a suitable operating time has elapsed, the particles collected in the chamber 44 may be removed by merely unthreading the restrictor 20 thereby permitting the particles to fall out.

The drawing and the foregoing specification constitute a description of the sediment trapping hydraulic restriction in such full, clear, concise and exact terms as to enable any person skilled in the art to practice the invention, the scope of which is indicated by the appended claim.

What I claim as my invention is:

An elongated one-piece restrictor which is adapted to be threadedly inserted into a conduit having a central bore which is threaded at one end and a counterbore adjacent the threaded end of the central bore, with the wall of the conduit between the central bore and the counterbore providing a shoulder, said restrictor comprising a head on one end which is spaced from the wall of the counterbore and an elongated cylindrically shaped stem on the other end which is spaced from the wall of the central bore thereby forming therewith an elongated annular particle collecting chamber when said restrictor is in said conduit, the cross-sectional area of said head being larger than the cross-sectional area of said stem, an intermediate portion which is externally threaded between said head and said elongated stem, the cross-sectional area of said intermediate portion being greater than the cross-sectional area of said stem but less than the cross-sectional area of said head, said head including an abutment surface which engages the shoulder of the conduit when said restrictor is placed in the conduit with said intermediate portion in threaded engagement with the threaded end of the central bore in the conduit, an axially extending restricted passage through said head and intermediate portion and terminating a relatively short distance from one end of said stem remote from said intermediate portion, a pair of laterally extending branch passages connected to said axially extending passage, said branch passages being in substantial alignment with one another so that the flow of fluid through each of said branch passages into said axially extending passage interfers with the flow of fluid through the other branch passage to produce an effective resistance to flow greater than the resistance attributed to the cross-sectional area of said branch passages, a solid deflector integrally formed on said one end of said elongated stem, said deflector having a surface portion spaced from the wall of the central bore and which slopes toward the wall of the central bore away from the axis of said restrictor and generally in the direction of flow through the conduit, said deflector having an annular rim which extends beyond the entrances to said branch passages to direct the foreign particles suspended in the fluid flowing through the conduit upstream of the restrictor away from the entrances to said branch passages from where the particles enter said collecting chamber by gravity, and a tool engaging formation in said head which is adapted to receive a tool for facilitating threaded engagement between the aforesaid intermediate portion of the restrictor and the threaded end of the central bore provided in the conduit.

References Cited in the file of this patent

UNITED STATES PATENTS

| | | |
|---|---|---|
| 1,919,408 | Work | July 25, 1933 |
| 2,401,665 | Schick | June 4, 1946 |
| 2,697,520 | Ellila | Dec. 21, 1954 |
| 2,779,478 | Wahlin | Jan. 29, 1957 |

FOREIGN PATENTS

| | | |
|---|---|---|
| 256,228 | Great Britain | Jan. 20, 1927 |
| 885,826 | France | Sept. 27, 1943 |